(12) United States Patent
Liang

(10) Patent No.: US 6,859,849 B2
(45) Date of Patent: Feb. 22, 2005

(54) METHOD AND ARCHITECTURE CAPABLE OF ADAPTIVELY ACCESSING DATA AND INSTRUCTIONS

(75) Inventor: Bor-Sung Liang, Kaohsiung (TW)

(73) Assignee: Sunplus Technology Co., Ltd., Hsin-Chu (TW)

( * ) Notice: Subject to any disclaimer, the term of this patent is extended or adjusted under 35 U.S.C. 154(b) by 0 days.

(21) Appl. No.: 10/417,259

(22) Filed: Apr. 17, 2003

(65) Prior Publication Data

US 2004/0049614 A1 Mar. 11, 2004

(30) Foreign Application Priority Data

Sep. 11, 2002 (TW) .......................................... 91120695

(51) Int. Cl.$^7$ .............................................. G06F 13/00
(52) U.S. Cl. .............................. 710/35; 710/8; 710/9; 710/10; 710/33; 710/34
(58) Field of Search ........................... 710/8–10, 33–35

(56) References Cited

U.S. PATENT DOCUMENTS 6,185,637 B1 * 2/2001 Strongin et al. .............. 710/35
6,473,814 B1 * 10/2002 Lyons et al. .................. 710/35

* cited by examiner

*Primary Examiner*—Kim Huynh
*Assistant Examiner*—Mike Nguyen
(74) *Attorney, Agent, or Firm*—Bacon & Thomas, PLLC

(57) ABSTRACT

A method and an architecture capable of adaptively accessing data and instructions are provided, in which a plurality of data transfer levels are predefined and a current data transfer level is used for accessing data and instructions of a memory. Each data transfer level corresponds to a length of a continuous data transfer via an interface between the memory and a cache device. Thus, the invention can dynamically adjust the current data transfer level based on burst lengths actually occurred as a processor kernel accesses data/instructions.

10 Claims, 5 Drawing Sheets

| ACCESSED ADDRESS | C0 | C1 | C2 | C3 | C4 | |
|---|---|---|---|---|---|---|
| 100 ⎫ | 0 | 0 | 0 | 0 | 0 | |
| 101 ⎪ BURST LENGTH=4 | 0 | 0 | 0 | 0 | 0 | |
| 102 ⎪ | 0 | 0 | 0 | 0 | 0 | |
| 103 ⎭ | 0 | 0 | 0 | 0 | 0 | |
| 180 ⎫ | 0 | 0 | 1 | 0 | 0 | $4=2^2$ |
| 181 ⎪ | 0 | 0 | 1 | 0 | 0 | |
| 182 ⎪ | 0 | 0 | 1 | 0 | 0 | |
| 183 ⎪ BURST LENGTH=8 | 0 | 0 | 1 | 0 | 0 | |
| 184 ⎪ | 0 | 0 | 1 | 0 | 0 | |
| 185 ⎪ | 0 | 0 | 1 | 0 | 0 | |
| 186 ⎪ | 0 | 0 | 1 | 0 | 0 | |
| 187 ⎭ | 0 | 0 | 1 | 0 | 0 | |
| 120 ⎫ | 0 | 0 | 1 | 1 | 0 | $8=2^3$ |
| 121 ⎪ | 0 | 0 | 1 | 1 | 0 | |
| 122 ⎪ | 0 | 0 | 1 | 1 | 0 | |
| 123 ⎪ BURST LENGTH=7 | 0 | 0 | 1 | 1 | 0 | |
| 124 ⎪ | 0 | 0 | 1 | 1 | 0 | |
| 125 ⎪ | 0 | 0 | 1 | 1 | 0 | |
| 126 ⎭ | 0 | 0 | 1 | 1 | 0 | |
| 200 | 1 | 1 | 2 | 1 | 0 | $7=2^0+2^1+2^2$ |
| .. | .. | .. | .. | .. | .. | |

FIG. 5

METHOD AND ARCHITECTURE CAPABLE OF ADAPTIVELY ACCESSING DATA AND INSTRUCTIONS

BACKGROUND OF THE INVENTION

1. Field of the Invention

The present invention relates to data and instruction access in a computer system and, more particularly, to a method and an architecture capable of adaptively accessing data and instructions.

2. Description of Related Art

The processing speed of CPU of a modem computer has increased significantly. Furthermore, such trend of increase is still continuing. It is known that a corresponding increase in accessing memory is required for increasing the total data and/or instruction access efficiency of the computer. In other words, a relatively slow memory is a bottleneck of the efficiency increase of the computer. For solving this problem, a cache memory is thus developed, in which a memory access unit is defined to have a constant length composed of a predetermined number of instructions or data, and such unit is called a cache line. The length of the unit is critical. For example, in a memory having a burst transfer capability, multiple data accesses can be performed by only giving one address and associated setting, so that a data string having the assigned burst length is continuously transferred. As a result, an initial delay prior to data transfer is decreased. In such memory, the length of the cache line is related to the burst length.

With reference to FIG. 1, it presents schematically a conventional processor architecture having the above cache capability. As shown, in case that a cache line having the required data or instructions is in the cache module 11a, the processor kernel 14 can fetch required data or instructions from a cache module 11 directly with no or very low time delay. However, if the required data or instructions are not in the cache module 11, a cache miss is encountered. At this moment, the processor kernel 14 has to command the cache module 11 to read the required data or instructions from a memory device 13. Such an operation is called cache refill. Thus, a significant system delay (called cache miss penalty) is occurred since all cache lines have to be stored in the cache module 11.

The cache miss penalty often occurs continuously when the processor kernel 14 accesses a certain section of program codes or data section at the first time. This can adversely affect the performance of the computer system. For solving this problem, a prefetching is proposed. As shown in FIG. 2, a prefetch module 12 is provided between the cache module 11 and the memory device 13. The prefetch module 12 acts to predict possible sections of program codes or data sections to be used next by the processor kernel 14 and read the same into the prefetch module 12. Once the processor kernel 14 finds that it is unable to get required data or instructions from the cache module 11 (i.e., a cache miss occurred), the prefetch module 12 is checked to search the data or instructions. If the required data or instructions are already in the prefetch module 12, a successful access is then realized, and the required cache lines are stored in the cache module 11 by reading the same from the prefetch module 12. As a result, the cache miss penalty is greatly reduced. However, a prefetch miss still may occur if the required data or instructions are not in the prefetch module 12. It is still required to get the required cache lines from the external memory device 13. Thus, a significant system delay (called prefetch miss penalty) is occurred.

Conventionally, the architecture of the prefetch module 12 is configured to be the same as the cache module, and thus the cache line is employed as the data length of the prefetch module 12. In other words, the length of a burst transfer in a dynamic random access memory (DRAM) is taken as a data transfer unit. However, the interface either between the prefetch module 12 and the cache module 11 or between the pre-fetch module 11 and the processor kernel 14 is not a DRAM interface. Hence, it is not necessary to take the cache line as a data transfer unit. Practically, data transfer rate may be significantly lowered if the cache line is used as the data transfer unit.

Specifically, three interfaces are provided in the processor structure with cache module 11 and prefetch module 12. The first interface 15 is an external interface between the prefetch module 12 and the external memory device 13. The second interface 16 is provided between the prefetch module 12 and the cache module 11. The third interface 17 is provided between the cache module 11 and the processor kernel 14 for transferring data/instruction from the cache module 11 to the processor kernel 14. Conventionally, data transfer unit taken in each of the first and the second interfaces 15 and 16 is the same as the data length of the cache line. As for data access via the third interface 17, if it is related to data access of either first or second interface, the data access can be performed only after the cache line has been accessed. However, the data length of the cache line is not an optimum data transfer unit between the prefetch module 12 and any one of the memory device 13, the cache module 11, and the processor kernel 14. This is because a length of the cache line is related to structure of the cache module 11. Theoretically, the length of the cache line is fixed during the working cycles of the processor kernel 14. However, the processor kernel 14 is dynamic in accessing data/instruction when being executed. Hence, an optimum performance of the processor kernel 14 is not obtained if the cache line having the fixed length is taken as the data transfer unit. As a result, resources are wasted.

For example, several problems have been found when a cache line having a fixed length is taken as a data transfer unit as follows:

(1) In the process of data transfer via the interface, it can be known that a long data string is about to be accessed and data length thereof is longer than a data length of the current cache line. However, the data length of the cache line is fixed, resulting in an inhibition of longer burst length setting, an inhibition of reduction of times of initial delay, and time consuming.

(2) In the process of data transfer via the interface, it can be known that a short data string is about to be accessed and data length thereof is shorter than the data length of the current cache line. However, as stated above, the data length of the cache line is fixed. As a result, it is still required to access data by taking the length of the cache line as an access unit and thus unnecessary data is accessed, resulting in a waste of limited resources.

SUMMARY OF THE INVENTION

The object of the present invention is to provide a method and an architecture capable of adaptively accessing data and instructions so as to dynamically adjust data size or the number of instructions accessed via interfaces during operation of a computer system, thereby achieving an optimum data/instruction access.

In one aspect of the present invention, there is provided an architecture capable of adaptively accessing data and instructions having a plurality of predefined data transfer levels in which a current data transfer level is used for accessing data and instructions. The architecture comprises: a first module capable of effecting a burst transfer for continuously sending or receiving a data string having a fixed burst length for access; a second module for storing data and instructions wherein each data transfer level corresponds to a length of a continuous data transfer via an interface between the first and the second modules; and an adaptive controller for dynamically adjusting the current data transfer level based on burst lengths actually occurred as the first module accesses data and instructions.

In another aspect of the present invention, there is provided a method capable of adaptively accessing data and instructions in which a plurality of data transfer levels is predefined in a first module and a current data transfer level is used for accessing data and instructions of a second module. The first module has a plurality of counters corresponding to the data transfer levels so as to record burst lengths actually occurred in the first module in a binary form. The method comprises the steps of: (A) assigning one of the data transfer levels as a current data transfer level; (B) calculating burst lengths actually occurred based on data and instructions accessed by the first module and recording the burst lengths in the counters; (C) determining whether a sum of counters of all data transfer levels higher or lower than the current level is larger than the counter of the current level by a first threshold, and if no, executing step (B); (D) selecting all the data transfer levels higher or lower than the current level to determine whether a difference between one counter having the highest value and another counter having the second highest value is larger than a second threshold, and if yes, the level corresponding to the counter having the highest value being taken as the current level, otherwise, the level corresponding to the counter having the second highest value being taken as the current level.

Other objects, advantages, and novel features of the invention will become more apparent from the detailed description when taken in conjunction with the accompanying drawings.

BRIEF DESCRIPTION OF THE DRAWINGS

FIG. 5 is a diagram showing actually occurred burst lengths recorded by counters for calculating the number of data transfer levels occurred.

DETAILED DESCRIPTION OF THE PREFERRED EMBODIMENT

Figure 1:
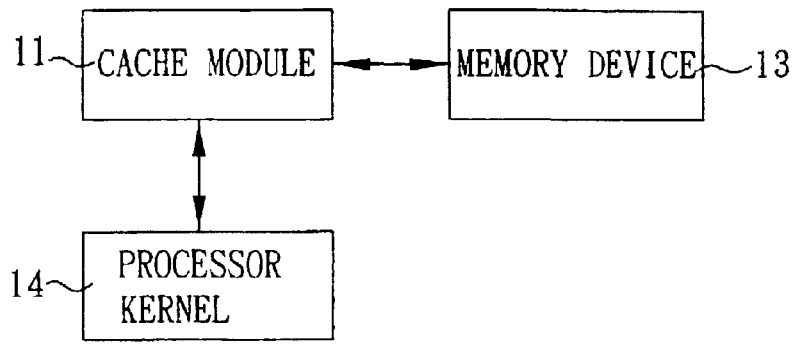
FIG. 1 schematically illustrates a conventional processor architecture having the cache capability.
Figure 2:
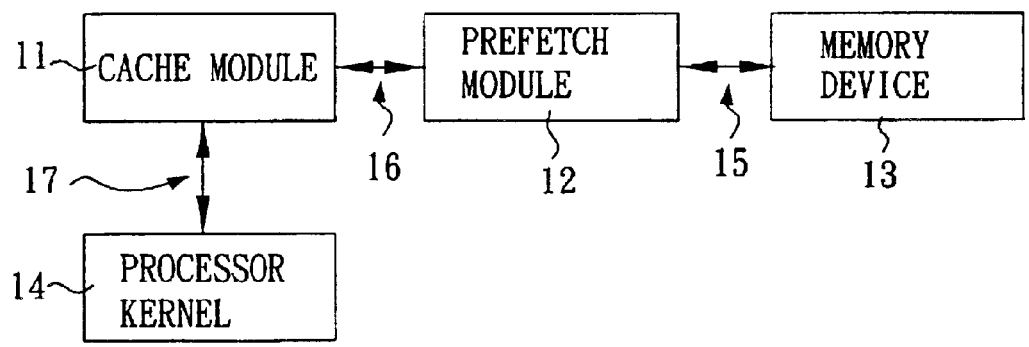
FIG. 2 schematically illustrates another conventional processor architecture having the cache capability.
Figure 3:
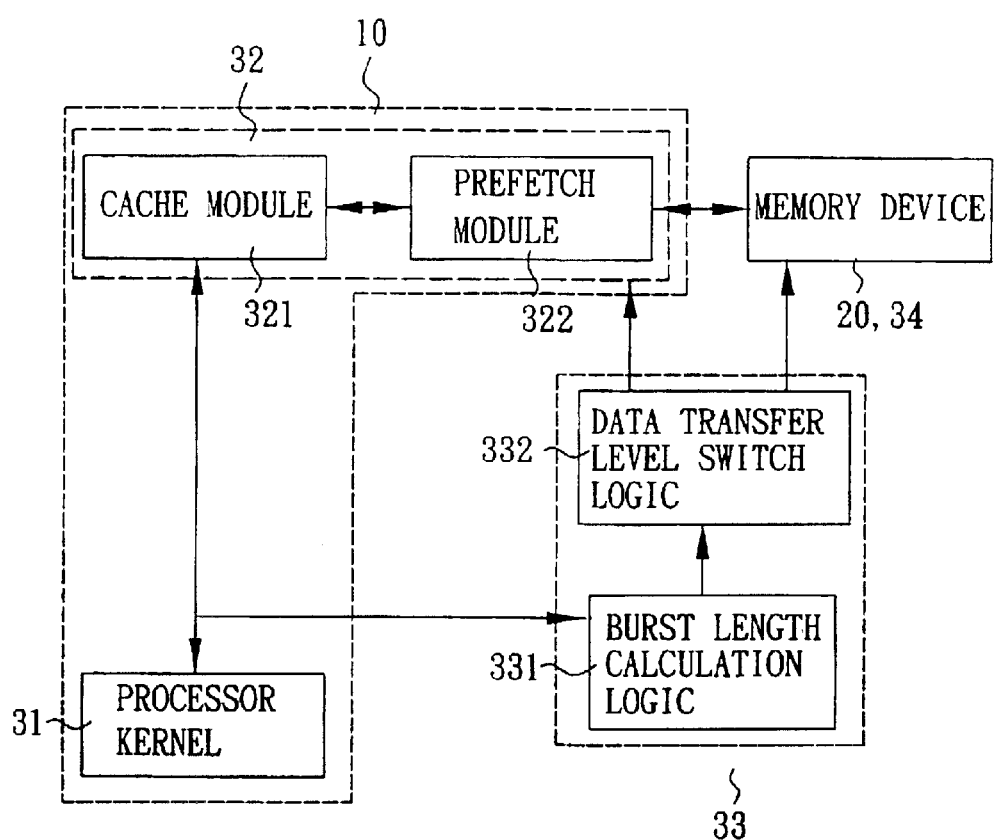
FIG. 3 schematically illustrates an architecture capable of adaptively accessing data and instructions in accordance with an embodiment of the invention.

With reference to FIG. 3, there is shown an architecture for adaptively accessing data and instructions in accordance with the present invention, which comprises an adaptive controller 33 disposed between a first module 10 and a second module 20 in a computer system for controlling data transfer therebetween. The first module 10 can be a processor, digital signal, processor (DSP), direct memory access (DMA) master device, bus master device, specific operation module, or audio-video (AV) processing module. The second module 20 can be a memory device, DMA slave device, bus slave device, HD/CD-ROM/DVD device, or network device. In this embodiment, the first module 10 is a processor architecture and comprises a processor kernel 31 and a high-speed access device 32. The second module 20 is an external memory device 34, such as a DRAM. The high-speed access device 32 acts to store a portion of data and instructions sent from the memory device 34, which is available for the processor kernel 31 to access in a high speed. The high-speed access device 32 can be a cache module, a cache module and a prefetch module, or a temporary memory. In the embodiment, the high-speed access device 32 is comprised of a cache module 321 and a prefetch module 322. The processor kernel 31 has the capability of burst transfer for continuously outputting a data string having a fixed burst length for access.

The adaptive controller 33 acts to control the data size accessed via an interface between the prefetch module 322 and the memory device 34, an interface between the prefetch module 322 and the cache module 321, and an interface between the cache module 321 and the CPU kernel 31 respectively. In the embodiment, a plurality of data transfer levels are predefined. Each data transfer level corresponds to a length of a continuous data transfer via the interface either between the prefetch module 322 and the memory device 34 or between the prefetch module 322 and the cache module 321. For example, data transfer levels 0 to N correspond to $2^0$ to $2^N$ length units of the continuous data transfer, respectively. The adaptive controller 33 selects an optimum data transfer level by monitoring status of data transferred on interfaces.

The adaptive controller 33 comprises a burst length calculation logic 331 and a data transfer level switch logic 332. The burst length calculation logic 331, in response to issuing a data transfer instruction, acts to calculate a length of continuous data string sent from the processor kernel 31. As a result, it is possible of obtaining an actually occurred burst length when the processor kernel 31 is performing an access of data/instructions. Thus, the data transfer level switch logic 332 can accumulate the actually occurred burst lengths so as to optimize an adjustment of the data transfer levels. For example, if a data transfer performed by the processor kernel 31 is detected to be a continuous transfer of long data string, i.e., long burst length, the data transfer level is increased accordingly. This can increase the length of data string transferred on the interface, resulting in an increase of efficiency of interface data transfer. Otherwise, if the data transfer performed by the processor kernel 31 is detected to be a scattered one, i.e., short burst length, the data transfer level is decreased accordingly. This can decrease the length of data string transferred on the interface for decreasing the probability of transferring unnecessary data/instructions, which must be discarded eventually, thereby increasing the correctness and the efficiency of interface data transfer.

Figure 4:
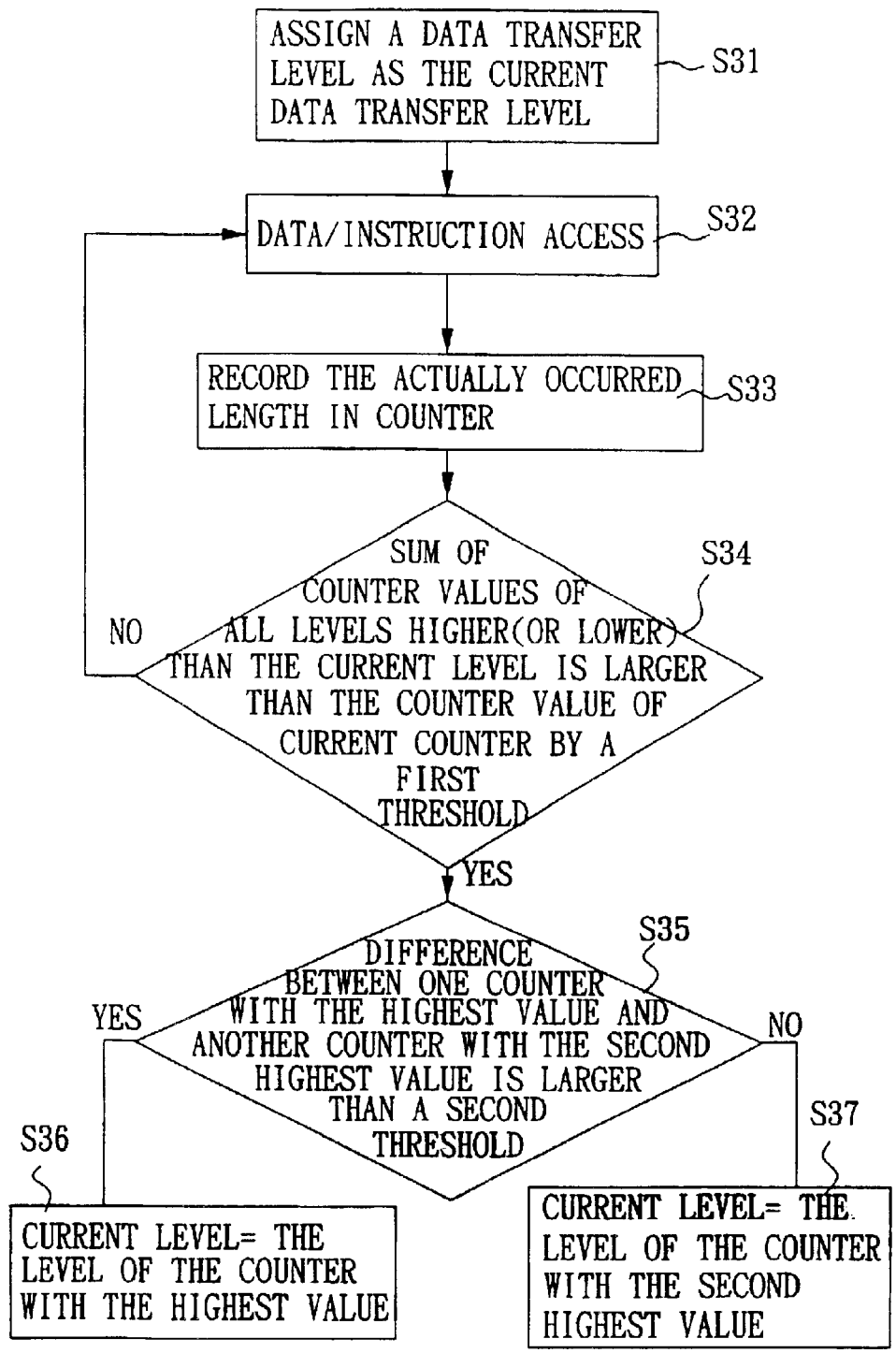
FIG. 4 is a flow chart illustrating a process for adaptively accessing data and instructions according to the invention.

With reference to FIG. 4, a switching control process performed by the data transfer level switch logic 332 is illustrated. It is assumed that there are five data transfer levels, i.e., from 0 to 4. Further, the data transfer level switch logic 332 provides five corresponding counters C0 to C4 to record the length of continuous transfer of data actually occurred in the processor kernel 31 in a binary form, so as to calculate the number of continuous data transfers having the same length as each of the data transfer levels. First, there is assigned a data transfer level as the current data transfer level (step S31). Next, the processor kernel 31 performs data/instruction access (step S32). The burst length calculation logic 331 calculates a burst length actually occurred based on the data/instruction access performed by the processor kernel 31. Also, the burst length is recorded in the counters C0 to C4 (step S33). With reference to FIG. 5, for example, the counter C2 is incremented if the burst length is 4; the counter C3 is incremented if the burst length is 8; and each of the counters C0, C1, and C2 is incremented if the burst length is 7.

In step 34, it is determined whether the sum of counter values of all levels higher (or lower) than the current level is larger than the counter value of the current level by a first threshold (step S34). If no, it indicates the current level conforms to the actual data transfer length, and the process loops back to step S32. If yes, the process goes to step S35 in which all the levels higher (or lower) than the current level are selected (if both of the levels higher than the current level and the levels lower than the current level are over the first threshold, the larger one is selected) to determine whether a difference between one counter having the highest value and another counter having the second highest value is larger than a second threshold. If yes, the level of the counter having the highest value is taken as the current level (step S36). Otherwise, the level of the counter having the second highest value is taken as the current level (step S37).

Note that the provision of thresholds in both steps S34 and S35 can avoid an excessive number of state transitions from occurring, thereby preventing the system performance from being adversely affected. Such thresholds may be predetermined values or determined by a function. The difficulty of passing the threshold is related to the cost of switching the length of continuous data transfer in the memory device 34. For example, the difficulty of passing the threshold can be increased if the cost of switching the length of continuous data transfer in the memory device 34 is relatively high.

For example, it is assumed that the current level is two, and it is found that a sum of the counters C3 and C4 is higher than the counter C2 having the current level and the difference is larger than the second threshold after a period time of operation has lapsed, the adaptive controller 33 increases the level accordingly. Further, a comparison between the counters C3 and C4 is made. If the counter C3 is larger than the counter C4 and the difference is larger than the second threshold, it indicates that data transfer in the level 4 is much more than that in the level 3. Also, a continuous transfer of 16 data records/instructions is most often occurred as data/instructions are transferred from the data transfer level switch logic 332 to the burst length calculation logic 331. At this time, a continuous data transfer unit is set to have 16 data records/instructions, thereby significantly increasing the data transfer efficiency. In this case the level is set as 4. If the counter C4 is larger than the counter C3 but the difference is smaller than the second threshold, the level is set as 3. At this time, a continuous data transfer unit is set to have 8 data records/instructions.

Figure 6:
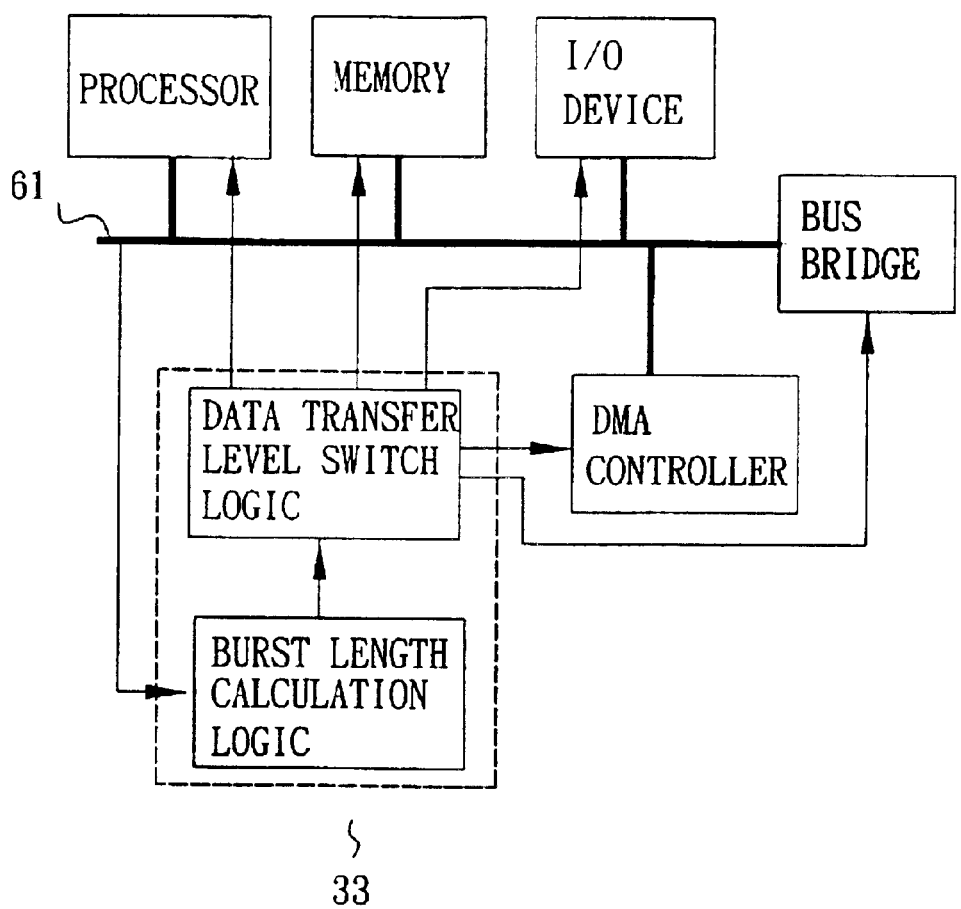
FIG. 6 schematically illustrates an architecture capable of adaptively accessing data and instructions in accordance with another embodiment of the invention.

The first embodiment is described with respect to a data transfer between any two modules controlled by the adaptive controller 33. It is appreciated that the adaptive controller 33 can be employed to control a data transfer on a bus. This is best illustrated in FIG. 6 that shows a second preferred embodiment of the invention. As shown, a bus 61 is coupled to a plurality of modules such as a processor, a burst mode controller, an I/O device, a DMA controller, and a bus bridge. Similar to the first embodiment, the adaptive controller 33 can control a data transfer performed via the bus 61 between any two modules on the bus 61.

In view of the foregoing, it is appreciated that the invention utilizes the adaptive controller 33 to monitor the actually occurred burst lengths as the processor kernel 31 is accessing data/instructions. Furthermore, the actually occurred burst lengths can be accumulated so as to optimize an adjustment of the data transfer levels. As a result, the efficiency of data/instruction access or prefetch can be increased.

Although the present invention has been explained in relation to its preferred embodiment, it is to be understood that many other possible modifications and variations can be made without departing from the spirit and scope of the invention as hereinafter claimed.

What is claimed is:

1. An architecture capable of adaptively accessing data and instructions having a plurality of predefined data transfer levels in which a current data transfer level is used for accessing data and instructions, comprising:
    a first module capable of effecting a burst transfer for continuously sending or receiving a data string having a fixed burst length for access;
    a second module for storing data and instructions wherein each data transfer level corresponds to a length of a continuous data transfer via an interface between the first and the second modules; and
    an adaptive controller for dynamically adjusting the current data transfer level based on continuous data transfers actually occurred as the first module accesses data and instructions, wherein, in the data transfer levels corresponding to the actually occurred continuous data transfers, if a number of actually occurred data transfer levels higher than the current data transfer level is more than that of actually occurred current data transfer levels by a first threshold, the data transfer level is incremented; otherwise, if a number of actually occurred data transfer levels lower than the current data transfer level is more than that of actually occurred current data transfer levels by the first threshold, the data transfer level is decremented.

2. The architecture capable of adaptively accessing data and instructions as claimed in claim 1, wherein the second module is a memory device and the first module comprises:
    a processor kernel capable of effecting a burst transfer for continuously sending or receiving the data string having the fixed burst length for access; and
    a high-speed access device for storing a portion of data and instructions sent from the second module, which is available for the processor kernel to access in a high speed, wherein each data transfer level corresponds to a length of a continuous data transfer via an interface between the second module and the high-speed access device.

3. The architecture capable of adaptively accessing data and instructions as claimed in claim 2, wherein the adaptive controller comprises:
    a burst length calculation logic, in response to issuing a data transfer instruction, operative to calculate the length of the continuous data transfer sent from the processor kernel so as to obtain the actually occurred burst lengths when the processor kernel is accessing data and instructions; and
    a data transfer level switch logic for recording the actually occurred burst lengths, and adjusting the current data transfer level based on the recorded burst lengths.

4. The architecture capable of adaptively accessing data and instructions as claimed in claim 3, wherein the data transfer level switch logic comprises a plurality of counters corresponding to the data transfer levels so as to record the length of the continuous data transfer actually occurred in the processor kernel in a binary form.

5. The architecture capable of adaptively accessing data and instructions as claimed in claim 4, wherein, if a sum of counters corresponding to all data transfer levels higher or lower than the current level is larger than the counter of the current level by the first threshold, a level of the counter having the highest value in all the levels higher or lower than the current level is taken as the current level.

6. The architecture capable of adaptively accessing data and instructions as claimed in claim 4, wherein, if a sum of counters corresponding to all data transfer levels higher or lower than the current level is larger than the counter of the current level by the first threshold, all the data transfer levels higher or lower than the current level are selected to determine whether a difference between one counter having the highest value and another counter having the second highest value is larger than a second threshold, and if yes, the level corresponding to the counter having the highest value is taken as the current level, otherwise, the level corresponding to the counter having the second highest value is taken as the current level.

7. The architecture capable of adaptively accessing data and instructions as claimed in claim 3, wherein the high-speed access device comprises a cache module and a prefetch module, and each data transfer level corresponds to a length of a continuous data transfer via an interface between the memory device and the prefetch module, and to a length of a continuous data transfer via an interface between the cache and the prefetch modules.

8. The architecture capable of adaptively accessing data and instructions as claimed in claim 3, wherein the data transfer level N corresponds to 2N length units of the continuous data transfer.

9. The architecture capable of adaptively accessing data and instructions as claimed in claim 1, wherein the first and the second modules transfer data via a bus.

10. A method capable of adaptively accessing data and instructions in which a plurality of data transfer levels is predefined in a first module, and a current data transfer level is used for accessing data and instructions of a second module, the first module having a plurality of counters corresponding to the data transfer levels so as to record burst lengths actually occurred in the first module in a binary form, the method comprising the steps of:

(A) assigning one of the data transfer levels as a current data transfer level;

(B) calculating burst lengths actually occurred based on data and instructions accessed by the first module and recording the burst lengths in the counters;

(C) determining whether a sum of counters of all data transfer levels higher or lower than the current level is larger than the counter of the current level by a first threshold, and if no, executing step (B);

(D) selecting all the data transfer levels higher or lower than the current level to determine whether a difference between one counter having the highest value and another counter having the second highest value is larger than a second threshold, and if yes, the level corresponding to the counter having the highest value being taken as the current level, otherwise, the level corresponding to the counter having the second highest value being taken as the current level.

* * * * *